United States Patent [19]

Hultquist

[11] 4,398,855
[45] Aug. 16, 1983

[54] TOGGLE TYPE FASTENER

[76] Inventor: John V. Hultquist, 10500 Westminster St., Apt. #13, Garden Grove, Calif. 92643

[21] Appl. No.: 251,953

[22] Filed: Apr. 6, 1981

[51] Int. Cl.³ .............................................. F16B 13/04
[52] U.S. Cl. .................................................... 411/340
[58] Field of Search ............... 411/340, 341, 342, 343, 411/344, 345, 346, 349

[56] References Cited

U.S. PATENT DOCUMENTS

| | | | |
|---|---|---|---|
| 549,069 | 10/1895 | Lever | 411/340 |
| 1,084,284 | 1/1914 | Merrill | 411/346 |
| 1,516,242 | 11/1924 | Peirce | 411/346 |
| 1,733,133 | 10/1929 | Anderson | 411/345 |
| 1,733,693 | 10/1929 | Porter | 411/346 X |
| 2,519,511 | 8/1950 | Stelder | 411/342 |
| 3,127,807 | 4/1964 | Modrey | 411/340 |
| 4,285,264 | 8/1981 | Einhorn | 411/345 |

FOREIGN PATENT DOCUMENTS

| | | | |
|---|---|---|---|
| 245860 | 7/1963 | Australia | 411/346 |
| 600116 | 3/1948 | United Kingdom | 411/346 |

Primary Examiner—Thomas J. Holko
Attorney, Agent, or Firm—Dean P. Edmundson

[57] ABSTRACT

This unique cylinder shaped toggle type fastener may be used with either a bolt having a saddle type head or a bolt having a saddle type nut. The shape of the slotted toggle having one end tooth shaped allows it to be easily tipped into a saddle from the parallel position with the shank to the perpendicular position from the shank of the bolt or screw after being inserted through the hole in the material it is to be fastened to. The unique shape also leaves a flat V-shaped surface that abutts to the inside of the material. The design of the toggle eliminates the necessity of any pins giving the toggle much greater strength than other varieties. This type of fastener may be manufactured out of any kind of metal, plastic or nylon.

10 Claims, 10 Drawing Figures

TOGGLE TYPE FASTENER

BRIEF SUMMARY OF THE INVENTION

This invention pertains to toggle type bolt or screw fasteners which have been in existence for a long time. The purpose of a toggle bolt is to provide a solid internal anchor when one or more pieces of material or fixtures are to be fastened together with access from one side is prohibited. Such existing types are shown in U.S. Pat. Nos. 644,155; 1,269,912 and 3,288,014. The existing type toggle bolts have one main basic feature as they all are pivoted on a pin or similar design using a pivoting point generally half of the size of the shank. This type of a toggle bolt fastener is ony as strong as the pin. When using this type of a toggle bolt it is often necessary to use a large toggle bolt to fasten the material securely. The type of a toggle bolt fastener shown in this application does not have any pins or bearing surfaces formed on a threaded nut. One of the purposes of this fastener is to allow the fastener to be made so the toggle and the shank of the bolt or screw may be made in any desired length. Another purpose of this fastener is that it can be manufactured simply and has few parts. Another purpose of this fastener is the simple way of tipping the modified cylinder into a perpendicular position once the bolt or screw is inserted through a hole in the material to be fastened.

BRIEF INVENTION DESCRIPTION

This is a toggle type fastener which is similar to the toggle type bolts or fasteners that are now in use with the exception that it has no pin. This fastener can be easily manufactured in different sizes and types. Having no pin allows this fastener to be extremely strong for its size. It may be manufactured out of various grades of metal, nylon or plastic. It consists of a substantially cylindrically shaped toggle, hereafter referred to as the cylinder, that is slotted from opposite ends. The width of the slot in the cylinder being slightly larger than the diameter of the shank of the bolt or screw that the slotted cylinder surrounds. The depth of the slot is the thickness of the cylinder plus the diameter of the shank, therefore, leaving a hole through opposite sides of the walls of the cylinder at the point that the slots overlap each other. The cylinder are also tapered from opposite ends. The wider part of the taper starting from the slotted end. The length of the slots opposite each other are half of the length of the cylinder plus one-half of the diameter of the shank of the bolt or screw. These cylinder ends are angled at parallel angles to each other. This cylinder is inserted through a bolt or screw that has either a saddle type bolt head or a saddle type nut each having a concave surface. This slotted cylinder surrounds a bolt or screw having the head of the bolt or the threaded saddle type nut being the first part that is inserted through the material or materials that is followed by the modified cylinder surrounding the shank. After the head and the slotted cylinder are inserted through the hole of the material the shank of the bolt or threaded shank is allowed to be slighty off set towards the side of the hole in the material. Then the tooth-like part of the cylinder bites into the material when the shank is slightly withdrawn thus allowing the cylinder to easily tip into a perpendicular position from the shank resting in the saddle of the bolt head or nut. The cylinder is held in position with a non-hardening adhesive while being inserted and the angled ends simply are for aiding the cylinder to tip easily. This fastener is then tightened when using the saddle type bolt head by having a washer and nut on the outside or when using a saddle type nut, a common bolt or screw is used. The screw head may be of any of the common screw type heads such as a slotted round head bolt or hexheaded cap screw. During tightening, the concave surface of the saddle-type bolt or nut bears against the upper and side surfaces of the cylinder to prevent rotation therebetween.

DETAILED INVENTION DESCRIPTION

The invention is described in more detail hereinafter in connection with the accompanying drawings wherein.

Figure 1:
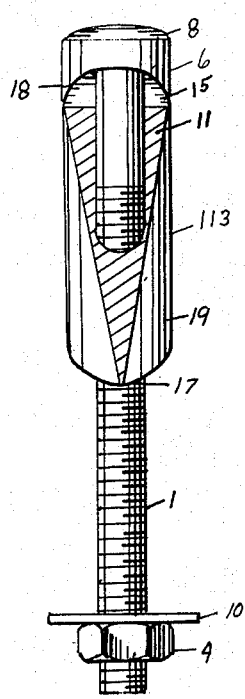
FIG. 1 is a side view of the toggle type fastener using a bolt with a saddle type head and a common nut.

More detailed explanation of FIG. 1. 8 shows the saddle type head of the bolt. 6 shows the cylinder shaped surface of the saddle type bolt head. 18 is the saddle shaped portion of the bolt head. 113 is the modified cylinder shaped toggle. 11 is one side of the V-shaped flat surface. 15 is the angled rounded end of the toggle 113. 19 showing the cylinder shape of the toggle 113. 17 showing the angled tooth like end portion of the toggle. 1 is the threaded portion of the shank of the toggle of the saddle type bolt. 10 is a common flat washer. 4 is a common hexhead nut.

Figure 2:
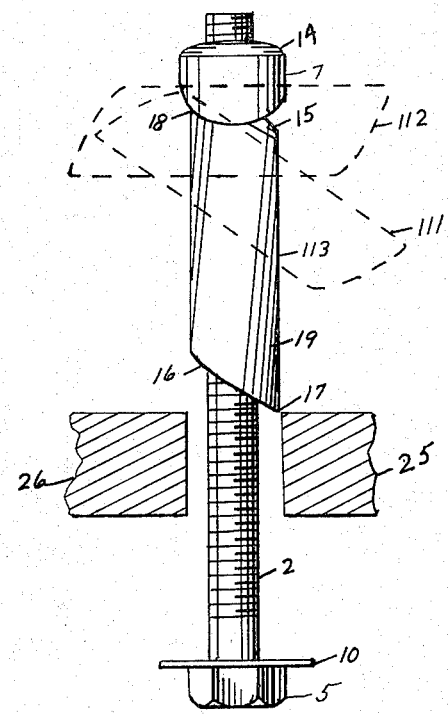
FIG. 2 is a side view of the toggle type fastener rotated 90° from FIG. 1.

FIG. 2 shows a common hexhead 5. Bolt 2 being used with a saddle type nut 14. This drawing also shows the toggle 113 being tipped from a parallel position with the shank of the bolt using the dotted lines 111 to the perpendicular position the toggle would assume when opened by the dotted lines 112. 7 shows the cylinder shaped part of the saddle nut 14. 18 shows a side view of the shape of the saddle type portion of either saddle type nut or bolt. FIG. 2 further shows the manner in which toggle 113, nut 14, and one end of bolt 2 are inserted through a hole in the material denoted by 25 and 26. After insertion through the hole, toggle 113 is tipped into position by being offset towards material 25 whereby the tooth-shaped portion of cylinder 17 may slightly catch or bite into material 25. By then pulling back on bolt shank 2, toggle 113 is tipped into the position shown by 112.

Figure 3:
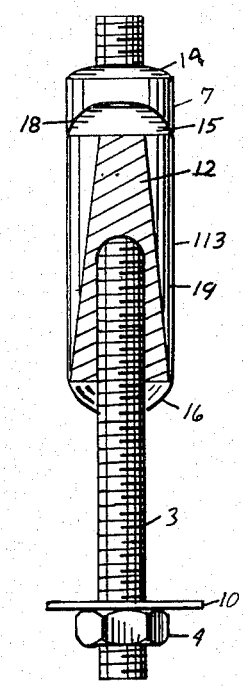
FIG. 3 is a side view of the toggle type fastener rotated 180° from FIG. 1.

FIG. 3 is simply a threaded shank having a saddle type nut 14 on one end and a common hexhead nut 4 on the other showing 113 180° from FIG. 1 whereas with a saddle type nut and a saddle type bolt this fastener may be tightened either by turning the shank 3 or by tightening the hexhead nut 4. 12 of 113 shows the flat surface on the opposite side of 113 flat surface 11. 16 shows the rounded bottom portion of 113 which is slightly concaved.

Figure 5:
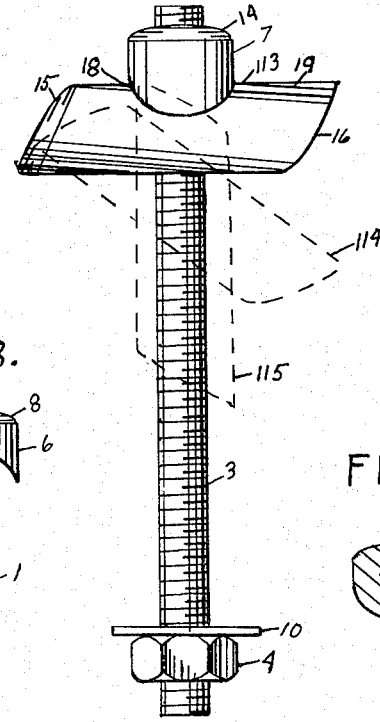
FIG. 5 is a side view of the toggle type fastener rotated 270° from FIG. 1.

FIG. 5 shows the toggle 113 in a perpendicular position from FIG. 3. 114 the toggle by dotted lines show the tipping action that the toggle 113 has taken to assume the perpendicular position from the shank 3 and when the dotted lines of the toggle 115 was in the parallel position shown by dotted lines 115 to the shank 3.

Figure 4:
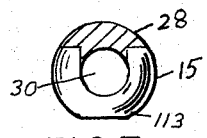
FIG. 4 is an end view of FIG. 7.
Figure 7:
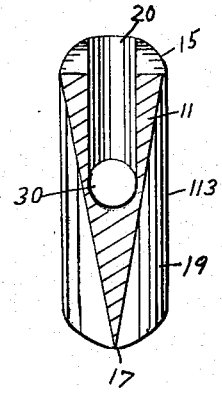
FIG. 7 is the front view of the toggle being used in FIG. 1.

FIG. 7 shows the slotted portion 20 of toggle 113 and also the perpendicular hole 30 through the toggle 113. FIG. 4 shows an end view of the toggle 113 with the parallel hole 30 the angular rounded surface 15 and an end view of the flat surface 28.

Figure 6:
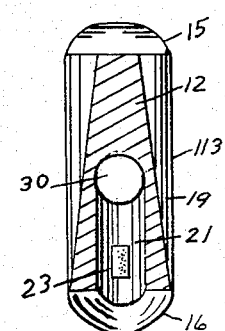
FIG. 6 is a front view of the toggle used in FIG. 3.

FIG. 6 shows the opposite side of the toggle in FIG. 7 with the slotted groove 21 and the small amount of adhesive 23 that shows the toggle in position while being inserted through the material.

Figure 10:
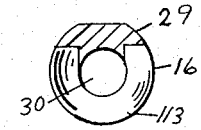
FIG. 10 is the end view of the toggle in FIG. 6.

FIG. 10 shows an end view of FIG. 6 showing the flattened surface of the toggle 29 and the slightly concaved rounded portion of the cylinder shaped portion 16.

Figure 9:
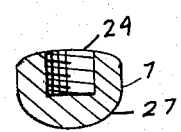
FIG. 9 is a side view of a saddle type nut.

FIG. 9 shows a saddle type nut 7 having the threaded portion 24 and the lower saddle shaped lip 27.

Figure 8:
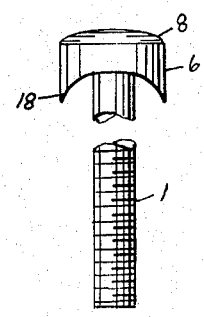
FIG. 8 is a side view of a saddle type bolt.

FIG. 8 shows the 2 broken portions of a saddle tipped bolt.

I claim:
1. A toggle type bolt or screw fastener comrising:
   (a) a shank which is at least partially threaded, wherein one end of said shank includes a saddle type end portion formed with a concave surface,
   (b) a substantially cylindrically shaped member having a longitudinal bore therethrough, said member being fitted around said shank, wherein said member has a length less than that of said shank, said member having longitudinal slots extending from opposite ends on opposite sides thereof in a manner such that an opening is defined which extends traversely through said member, said opening being unthreaded and being sufficiently large to enable said member to be tilted perpendicular to said shank after said member and said saddle end portion are inserted through a hole in a desired material, wherein the surfaces defined on said member by said longitudinal slots are planar. wherein said concave surface of said saddle end portion of said shank is adapted to engage and bear against the top and side surface of said member when said member is tilted perpendicularly to said shank to prevent the shank from rotating with respect to said member.

2. A fastener in accordance with claim 1, wherein each end of said member is tapered at an angle of approximately 30 to 60 degrees from the longitudinal axis of said member.

3. A fastener in accordance with claim 2, wherein said tapered ends are approximately parallel to each other wherein one said tapered end includes a tooth-like portion.

4. A fastener in accordance with claim 1, wherein one end of said member is adapted to rest within said saddle end portion of said shank.

5. A fastener in accordance with claim 1, wherein the surface of said member which is adapted to bear against said material is rough so as to grip said material.

6. A fastener in accordance with claim 1, wherein the length of said member is approximately twice the diameter of said shank.

7. A fastener in accordance with claim 1, wherein said shank comprises metal.

8. A fastener in accordance with claim 1, wherein said shank comprises plastic.

9. A fastener in accordance with claim 1, wherein said saddle end portion is integral with said shank.

10. A fastener in accordance with claim 1, wherein said member is detachably adhered to said shank by means of adhesive.

* * * * *